United States Patent [19]

Dao

[11] Patent Number: 4,646,220
[45] Date of Patent: Feb. 24, 1987

[54] DC POWER SUPPLY WITH COMPENSATED CURRENT REFERENCE

[76] Inventor: Kim Dao, 12 Nace Ave., Piedmont, Calif. 94611

[21] Appl. No.: 618,219

[22] Filed: Jun. 7, 1984

[51] Int. Cl.$^4$ .......................................... H02M 3/315
[52] U.S. Cl. ..................................... 363/28; 323/281; 363/49; 363/79
[58] Field of Search ............................ 363/28, 79, 96; 323/280, 281

[56] References Cited

U.S. PATENT DOCUMENTS

| | | | |
|---|---|---|---|
| 3,197,691 | 7/1965 | Gilbert | 363/28 |
| 3,307,098 | 2/1967 | Elliott . | |
| 3,414,798 | 12/1968 | Nielsen | 363/28 |
| 3,543,130 | 11/1970 | Reijnders | 363/28 |
| 3,805,142 | 4/1974 | Rando | 363/28 |
| 4,055,791 | 10/1977 | Bland et al. | 363/28 |
| 4,069,449 | 1/1978 | Farnsworth | 363/28 |
| 4,250,541 | 2/1981 | Chang et al. | 363/28 |
| 4,323,959 | 4/1982 | Check | 363/28 |
| 4,333,133 | 6/1982 | Pernyeszi | 363/96 |
| 4,446,560 | 5/1984 | Gabor | 363/28 |

FOREIGN PATENT DOCUMENTS

| | | |
|---|---|---|
| 0058035 | 8/1982 | European Pat. Off. . |
| 1952016 | 4/1970 | Fed. Rep. of Germany . |
| 2533775 | 3/1984 | France . |
| WO85/00939 | 2/1985 | PCT Int'Appl. . |
| 936279 | 6/1982 | U.S.S.R. ............................ 363/28 |

OTHER PUBLICATIONS

Roberts, "Stable Constant-Voltage Supply Uses Current Source to Establish Reference", Elect. Design 24, p. 176, 22 Nov. 76.
Wurzburg, "Floating Regulator gives 0.1% Regulation over 0-to-100-V-DC, 200 mA Range", Elect. Design 19, 13 Sep. 75.

Primary Examiner—William H. Beha, Jr.
Attorney, Agent, or Firm—Fliesler Dubb Meyer & Lovejoy

[57] ABSTRACT

A power supply 10 providing a DC output voltage comprises a voltage input circuit 11, a charge buildup and transfer circuit 14, a switch including SCR3 for selectively interconnecting the input circuit 11 and the charge buildup and transfer circuit 14, a trigger circuit including a unijunction transistor gating circuit 16 for triggering the SCR3, and a sensing circuit 22 including a current reference 26 for sensing the current output to the load 38 and comparing the output to current reference 26 while providing a comparison signal to the trigger circuit 16 so as to modify the triggering of SCR3 and thus the interconnection of the voltage input circuit 11 and the current buildup and transfer circuit 14.

18 Claims, 3 Drawing Figures

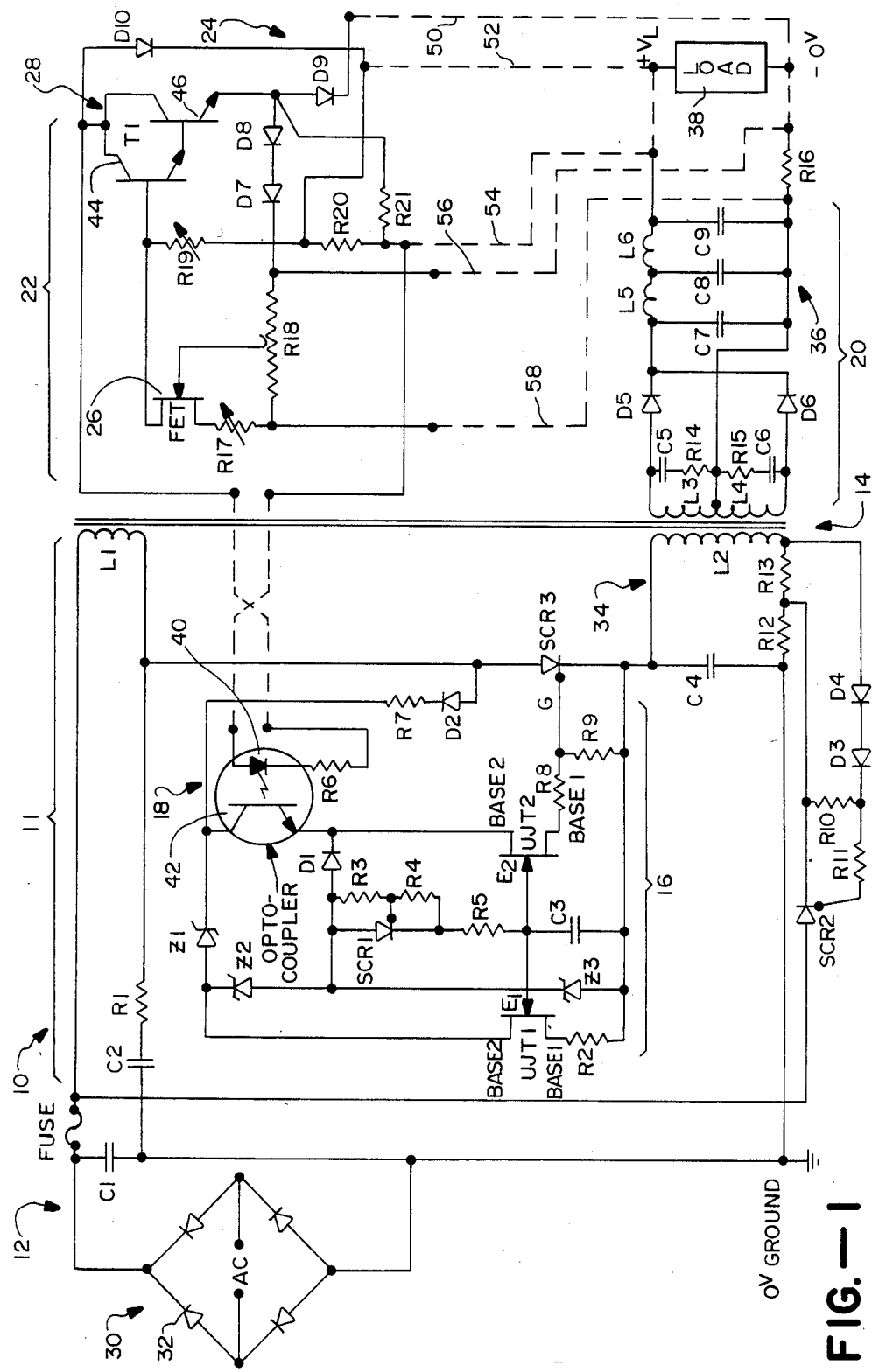
FIG.—1

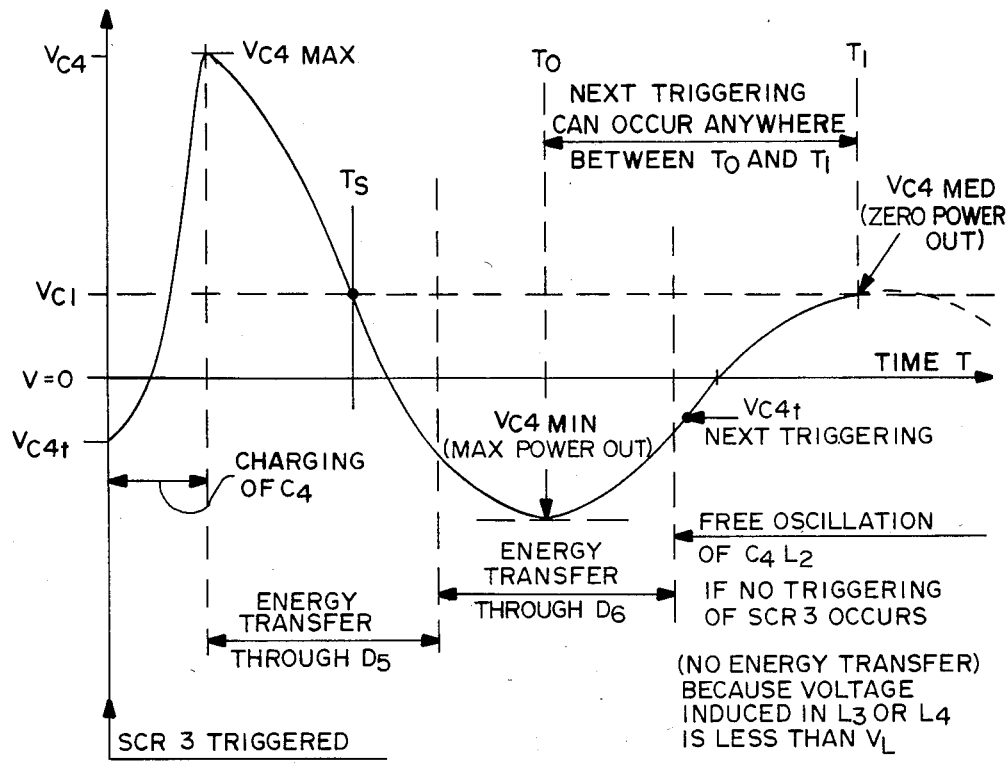
FIG.—2
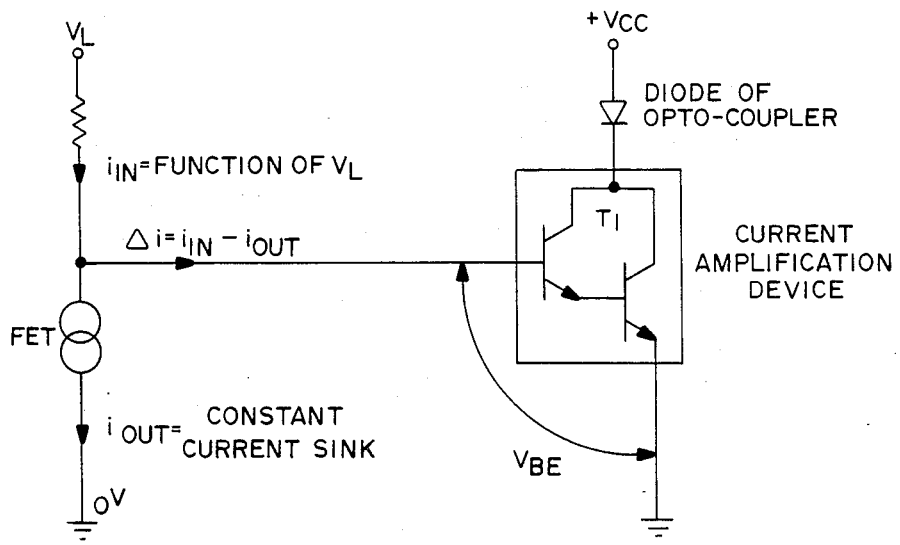
FIG.—3

4,646,220

DC POWER SUPPLY WITH COMPENSATED CURRENT REFERENCE

FIELD OF THE INVENTION

The present invention relates to power supplies and more particularly, to a power supply for producing a precise constant output irrespective of variations in the AC input voltage provided thereto and irrespective of changes in the load.

BACKGROUND OF THE INVENTION

A number of power supply arrangements are presently commercially available to provide a precise output irrespective of the variations in AC input voltage and changes in the load. As disclosed in U.S. Pat. No. 3,414,798 issued to Jorgen L. Nielsen on Dec. 3, 1968, one type of power supply is a switching device for selectively turning on and off the input voltage. In this power supply the input voltage is provided to rectifying and filtering networks which develop the desired output voltages. A feedback control loop samples the output of the power supply and provides the sampled voltage output to a comparison circuit which compares the sampled output with a reference voltage. A control signal is developed by the comparison circuit which is used to operate the switching device to switch on and off the input voltage at a rate to make the output voltage constant.

The prior art power supplies, however, have disadvantages in that generally it is more difficult to sample voltage output as voltage and make comparison thereof than to sample voltage outputs as current and make comparison thereof. Further such prior art devices provide no compensating signal to the reference source to compensate for the error signal. Also there is generally no consideration given to synchronizing the timing of switching on the input voltage at the same point in the cycle thereof in order to provide a precise voltage output.

SUMMARY OF THE INVENTION

The present invention is directed to overcoming the disadvantages of the prior art.

A preferred embodiment of the power supply of the invention includes a voltage input means for providing input voltage, charge buildup and transfer means for building up and transferring output to a load, trigger means for triggering the interconnection of the voltage input means and the charge buildup and transfer means, and sensing means for sensing the output to a load and comparing the output to a reference and providing a signal based on this comparison to the trigger means so as to modify the triggering of the interconnection of the voltage input means and the charge buildup and transfer means.

BRIEF DESCRIPTION OF THE FIGURES

FIG. 1 is an embodiment of the power supply of the invention.

FIG. 2 is a graph showing the charging cycle of the voltage buildup and transfer means of the invention.

FIG. 3 shows a simplified representation of the sensing circuit of the invention.

DETAILED DESCRIPTION OF THE PREFERRED EMBODIMENT

With reference to the figures, and in particular to FIG. 1, an embodiment of the Power Supply 10 of the invention is depicted which can be used, for example, to power a microprocessor requiring a steady 5-volt DC input. Power supply 10 includes the following subcomponents: high voltage input circuit 11 comprising AC power input circuitry 12 and charge buildup and transfer circuitry 14, triggering circuit 16 including optocoupler 18, output filter and load circuitry 20, and sensing circuit 22 including protection circuit 24.

In a preferred embodiment, the individual components are identified and valued as follows:

CAPACITORS $C_1$: 1050 microfarads; 330 WVDC, electrolytic
$C_2$: 0.0022 microfarad; 600 WVDC
$C_3$: 0.015 microfarad; 50 WVDC
$C_4$: 0.057 microfarad; 1600 WVDC
$C_5$: 0.33 microfarad; 100 WVDC
$C_6$: 0.33 microfarad; 100 WVDC
$C_7$: 6200 microfarads; 16 VDC; Mallory VPR622V016L3C
$C_8$: 6200 microfarads; 16 VDC; Mallory VPR622V016L3C
$C_9$: two $C_8$ capacitors in parallel

RESISTORS $R_1$: 200 ohm, 5 watt
$R_2$: 30 ohm, ⅛ watt
$R_3$: 15 K-ohm, ⅛ watt
$R_4$: 1 K-ohm, ⅛ watt
$R_5$: 470 K-ohm, ⅛ watt
$R_6$: 47 ohm, ½ watt
$R_7$: 12 K-ohm, 5 watt
$R_8$: 70 ohm, ⅛ watt
$R_9$: 470 ohm, ⅛ watt
$R_{10}$: 100 ohm, ⅛ watt
$R_{11}$: 40 ohm, ⅛ watt
$R_{12}$: 0.5 ohm, 14 watt
$R_{13}$: 0.05 ohm, 5 watt
$R_{14}$: 1.3 ohm, 2 watt
$R_{15}$: 1.3 ohm, 2 watt
$R_{16}$: 0.001 ohm, short segment of 18 gauge wire
$R_{17}$: 500 ohm, ¼ watt potentiometer
$R_{18}$: 1000 ohm potentiometer, ⅛ watt
$R_{19}$: 25 K-ohm potentiometer adjusted to 6.8 K-ohm, ⅛ watt
$R_{20}$: 120 ohm, ⅛ watt
$R_{21}$: 470 ohm, ⅛ watt

INDUCTORS $L_5$: Toroidal Permalloy (molybdenum) powder core, about 0.4 microhenrys
$L_6$: Toroidal Permalloy (molybdenum) powder core, about 0.2 microhenrys

TRANSFORMER

Toroidal powder core

Core: Arnold Engineering A123068-2
$L_1$: 36 turns, #16 wire; closely wound in 2 layers of 18 turns each
$L_2$: 171 turns, #16 wire; uniformly wound around the core in 2 layers L$_3$: 5 turns, #10 wire; closely wound in one layer, located opposite L$_1$ L$_4$: 5 turns, #16 wire; 3 coils connected in parallel, covering approximately one-third the core circumference opposite L$_1$

ZENER DIODES

Z$_1$: 6.2 volt Zener, 1 watt
Z$_2$: 5.1 volt Zener, 1 watt
Z$_3$: 13 volt Zener, 1 watt

DIODES

D$_1$: IN914
D$_2$: SK9000 (RCA)
D$_3$: IN914
D$_4$: IN914
D$_5$: VARO:VSK231
D$_6$: VARO:VSK231
D$_7$: IN914
D$_8$: IN914
D$_9$: IN914
D$_{10}$: IN914

SILICONE CONTROLLED RECTIFIERS (THYRISTORS)

SCR$_1$: SK3627
SCR$_2$: MCR 3918-6
SCR$_3$: SK3042

UNIJUNCTION TRANSISTORS

UJT1: ECG 6409 (Sylvania)
UJT2: ECG 6409 (Sylvania)
Opto-couplers 18: ECG3040
NFET 26: Radio Shack Cat. No. 276-1734, adjustable current source
T$_1$: Darlington transistor NPN, Radio Shack Cat. No. 276-2060

HIGH VOLTAGE INPUT CIRCUIT

The high voltage input circuit 11 includes a full wave rectifier bridge 30 which includes four diodes such as diode 32. The rectifier bridge 30 rectifies a 120 V AC line. Rectifier 30 is provided in parallel with a capacitor C$_1$. Capacitor C$_1$ becomes a DC source of unregulated voltage V$_{C1}$ (about 150 volts DC). The high voltage input circuit 11 further includes a transformer coil L$_1$ which is connected in series with capacitor C$_1$ and which communicates through a thyristor SCR$_3$ to the main charging capacitor C$_4$. The other terminal of C$_4$ is connected to the ground end of capacitor C$_1$. The charge buildup and transfer circuit 14 include capacitor C$_4$ and transformer coil L$_2$ which define a tank circuit 34 that transfers power to transformer coils L$_3$ and L$_4$ as will be explained below.

Initially the voltage V$_{C4}$ across capacitor C$_4$ is zero. At time zero the SCR$_3$ is triggered by a current pulse from trigger circuit 16 through the gate G. The line connecting transformer coil L$_1$ to capacitor C$_4$ is now closed. The current charging capacitor C$_4$ through transformer coil L$_1$ builds up sinusoidally in time until V$_{C4}$ peaks (at about 300 V). At this time the current reverses with capacitor C$_4$ now trying to charge capacitor C$_1$. This reverse current flows for a short time until thyristor SCR$_3$ stops conducting. Capacitor C$_4$ is now isolated from capacitor C$_1$ and transformer coil L$_1$.

Capacitor C$_4$ starts discharging through transformer coil L$_2$. In fact, capacitor C$_4$ starts discharging through transformer coil L$_2$ even during the charging of capacitor C$_4$, but because transformer coil L$_2$ is much larger than transformer coil L$_1$, the current through coil L$_2$ is smaller, therefore allowing the voltage V$_{C4}$ of capacitor C$_4$ to remain higher than V$_{C1}$ across capacitor C$_1$ for a long enough period to allow thyristor SCR$_3$ to turn off. During the charging and the discharging of capacitor C$_4$, whenever the biasing permits, diode D$_5$ will conduct current to the filtering and load circuits 20.

Eventually, due to the tank circuit 34 formed by capacitor C$_4$ and coil L$_2$, the voltage V$_{C4}$ across capacitor C$_4$ will go negative up to a voltage that permits diode D$_6$ to conduct current to the filtering and load circuits 20. The thyristor SCR$_3$ remains turned off.

The tank circuit 34 can continue to oscillate, transferring decreasing amounts of energy alternatively through diodes D$_5$ and D$_6$. The currents through diodes D$_5$ and D$_6$ and the voltage across coils L$_3$ and L$_4$ are averaged out by the inductors L$_5$ and L$_6$ and capacitors C$_7$, C$_8$ and C$_9$ which comprise the output filter 36 of filter and load circuitry 20.

It is to be understood that protection is provided by snubbers comprised of resistor R$_1$ and capacitor C$_2$, and also resistor R$_{14}$ and capacitor C$_5$, and also resistor R$_{15}$ and capacitor C$_6$.

THE TRIGGERING CIRCUIT

The triggering circuit 16 is provided in order to trigger the charging of capacitor C$_4$ by coil L$_1$ to maintain a constant voltage across the load. The trigger circuit 16 receives an input from the sensing circuit 22 which is proportional to the difference between the desired reference voltage V$_{ref}$ and the voltage provided to the load as measured by a current comparison. This input is in the form of a current which is directly proportional to the size of the voltage difference which is provided to the light emitting diode 40 of opto-coupler 18. This current controls the timing of the triggering of thyristor SCR$_3$.

The basic elements of the triggering circuit include opto-coupler 18, unijunction transistor UJT$_2$, capacitor C$_3$, Zener diode Z$_3$, diode D$_2$, thyristor SCR$_3$ and resistors R$_7$, R$_8$ and R$_9$. Opto-coupler 18, resistor R$_7$ and diode D$_2$ provide communication between capacitor C$_1$ and base 2 of transistor UJT$_2$. Base 1 of transistor UJT$_2$ is communicated to the gate G of thyristor SCR$_3$ through resistor R$_8$ and with ground through resistors R$_8$ and R$_9$ and capacitor C$_4$. The series combination of resistor R$_5$ and capacitor C$_3$ is provided in a parallel arrangement with Zener diode Z$_3$. This parallel arrangement is communicated between capacitor C$_1$ with other elements such as thyristor SCR$_1$ and resistors R$_3$, R$_4$ which will be discussed below, and ground.

The interconnection between resistor R$_5$ and capacitor C$_3$ communicates with the emitter E$_2$ of transistor UJT$_2$. Transistor UJT$_2$ is constructed such that when the voltage applied to emitter E$_2$ rises to a certain ratio (intrinsic ratio) of the voltage applied to base 2, the resistance between emitter and base 1 of transistor UJT$_2$ become very small, allowing capacitor C$_3$ to discharge across transistor UJT$_2$. The greater the current from the sensing circuit 22 passing through opto-coupler 18, the higher the voltage at base 2 of transistor UJT$_2$, and the larger capacitor C$_3$ must charge before the intrinsic ratio is reached.

Assume the voltage across capacitor C$_4$ (V$_{C4}$) is higher than the voltage across the series combination of coil L$_1$ and C$_1$ (V$_{L1}$), the voltage across the triggering circuit 16 is essentially zero because diode $D_2$ is reverse biased, and capacitor $C_3$ is completely discharged. In FIG. 1, capacitor $C_4$ communicates with diode $D_2$ through zener diodes $Z_1$, $Z_2$, $Z_3$ and resistor $R_7$. Thus as $V_{C4}$ decreases with respect to $V_{L1}$, eventually diode $D_2$ is forward biased, and current starts charging up capacitor $C_3$ and immediately sets the voltage across Zener diode $Z_3$ to a maximum voltage $V_{Z3}$. Given sufficient time, the voltage across $C_3$ ($V_{C3}$) will rise to $V_{Z3}$. When capacitor $C_3$ has a voltage high enough, emitter $E_2$ of transistor $UJT_2$ will conduct and discharge capacitor $C_3$ through the gate G of thyristor $SCR_3$ triggering the charging of capacitor $C_4$. As thyristor $SCR_3$ conducts, the voltage across the triggering circuit 16 and the voltage across Zener diode $Z_3$ ($V_{Z3}$) again drops essentially to substantially zero. This fact resets the transistor $UJT_2$ very fast for the next triggering and allows resistor $R_5$ to be small for a fast charging of capacitor $C_3$. Resistor $R_5$ can be much smaller than would be possible if $V_{Z3}$ is set constant.

The object of regulation is to maintain a constant voltage $V_L$ across the load 38. When the load demands more energy (for instance the load resistance is lowered), the triggering of thyristor $SCR_3$ must occur more frequently (running at a higher frequency), and/or the voltage $V_{C4}$ must be charged to a higher value.

In this power supply 10, a single control modulates both frequency and charged voltage $V_{C4}$. Since both frequency and voltage are controlled, the frequency need not change very much from full load to almost zero load. In fact the frequency need only change from about 30 KHz to 15 KHz.

FIG. 2 shows the thyristor $SCR_3$ initially being triggered at time $t=0$ and how the voltage $V_{C4}$ (measured with reference $V=0$ volts at the ground end of capacitor $C_1$) varies with time. The energy transferred to the load during the charging of capacitor $C_4$ has been neglected.

The next triggering of thyristor $SCR_3$ can occur any time from $t=T_0$ (when $V_{C4}$ reaches a minimum) to $t=T_1$ (when $V_{C4}$ reaches a second maximum $V_{C4med}$ in the free oscillation zone or when $V_{C4}=V_{C1}$, whichever comes first). The maximum charged voltage of capacitor $C_4$, $V_{C4max}$, depends on where the triggering occurs. If $V_{C4t}$ is the algebraic value of $V_{C4}$ at triggering time, then:

$$V_{C4max} \approx 2V_{C1} - V_{C4t}$$

The energy transferred per cycle is thus:

$$\tfrac{1}{2}C_4(V^2_{C4max} - V^2_{C4t}) = 2C_4 V_{C1}(V_{C1} - V_{C4t})$$

Maximum power occurs at $V_{C4t} = -V_{C4min}$ and zero power occurs and $V_{C4t} = +V_{C1}$.

The time $T_S$ where the charging of capacitor $C_3$ of the triggering circuit 16 begins is always synchronized with the $V_{C4}$ waveform because $V_{C3}$ remains zero from the last triggering up to $T_S$ (where $V_{C4}$ begins to be lower than $V_{C1}$). The charging of $C_3$ also follows a fixed pattern in time because resistor $R_5$ and capacitor $C_3$ and the voltage $V_{Z3}$ at Zener diode $Z_3$ are constants during this charging. The timing for the next triggering is done by varying the base 2 voltage of transistor $UJT_2$ which depends on how much current is fed to it from transistor 42 of opto-coupler 18.

The amount of current flowing through the diode 40 of the opto-coupler 18 comes from the sensing circuit 22 (discussed below). The larger the current, the longer it takes capacitor $C_3$ to build up a charge which is equal to the intrinsic ratio times the voltage at base 2 of transistor $UJT_2$ and the larger the interval before thyristor $SCR_3$ is triggered, and thus (FIG. 2) the lower the power output to output filter and load circuit 20. Thus in this embodiment the rate of charging of capacitor $C_3$ is a constant and the voltage at base 2 of transistor $UJT_2$ is varied with time, depending on the signal from the sensing circuit 22. A diode $D_1$ is used to assure that $V_{base2}$ of transistor $UJT_2$ never goes below $V_{Z3}$ where improper triggering of thyristor $SCR_3$ may occur (i.e., insufficient voltage to turn on thyristor $SCR_3$).

Expanding on the above triggering circuit 16 in FIG. 1, series resistors $R_3$ and $R_4$ are provided in parallel with thyristor $SCR_1$, with the gate of thyristor $SCR_1$ communicating with the interconnection between resistors $R_3$ and $R_4$. This parallel arrangement between resistors $R_3$, $R_4$ and thyristor $SCR_1$ communicates capacitor $C_1$ with resistor $R_5$ and capacitor $C_3$ via diode $D_2$, resistor $R_7$ and Zener diodes $Z_1$, $Z_2$.

At start up, when the input capacitor $C_1$ is charging up, the rate of increase of $V_{C1}$ is slow, of the order of the AC line frequency times the line voltage. The first discharge of capacitor $C_3$ through the emitter of transistor $UJT_2$ will occur at low voltage if $R_5$ is too small (as is desirable for other than start-up). This will not trigger thyristor $SCR_3$, therefore the transistor $UJT_2$ may not reset.

At start-up there must be a large resistor $R_3$ in series with resistor $R_5$ to slow down the charging of capacitor $C_3$, allowing time for the voltage at the base $B_2$ of the transistor $UJT_2$ to grow large enough for the triggering of thyristor $SCR_3$. But resistor $R_3$ must drop out during normal operation. This is achieved with thyristor $SCR_1$.

After the first discharge, the thyristor $SCR_1$ will be turned on at the next charging of capacitor $C_3$ because the current through resistor $R_3$ is then large enough to turn on thyristor $SCR_1$, thus bypassing resistor $R_3$. Since the turn-off time of thyristor $SCR_1$ is chosen to be large, $SCR_1$ is essentially on all the time after the first shooting of capacitor $C_3$.

A unijunction transistor $UJT_1$ is also provided with base 2 thereof communicating with the series interconnection between Zener diode $Z_1$ and $Z_2$ and base 1 connecting with resistor $R_2$. The emitter $E_1$ of transistor $UJT_1$ communicates with the series interconnection between resistors $R_5$ and capacitor $C_3$ and thus with the emitter $E_2$ of transistor $UJT_2$.

In practice, thyristor $SCR_3$ may not turn off when it is triggered at $V_{C4}$ too close to $V_{C1}$ (FIG. 2). Therefore capacitor $C_3$ has to be discharged by some means when the voltage $V_{base2}$ of transistor $UJT_2$ imposes a triggering time where $V_{C4t}$ is too close to $V_{C1}$ (around $V_{c4med}$ in FIG. 2).

The value of resistor $R_7$ is chosen such that thyristor $SCR_3$ cannot be turn-on when $V_{C4t}$ is near $V_{C1}$. At a low value for $V_{C1} - V_{C4}$, the current through resistor $R_7$ is primarily channeled into the transistor $UJT_2$ because $V_{Z1} + V_{Z2} + V_{Z3}$ is higher than the base 2 voltage of $UJT_2$ (the impedances of the Zener diodes $Z_1$, $Z_2$ and $Z_3$ are at this point very large). Resistor $R_7$ allows only enough current to maintain $V_{base2}$ of transistor $UJT_2$ high, preventing the discharge of capacitor $C_3$ to thyristor $SCR_3$. The $V_{base2}$ of transistor $UJT_1$, on the other hand, is deprived of current and fully conducts as the emitter voltage is greater than the intrinsic ratio times the voltage at base 2, discharging capacitor $C_3$ into resistor $R_2$.

It is to be understood that over current protection for thyristor $SCR_3$ is provided by thyristor $SCR_2$ and resistors $R_{10}$, $R_{11}$, $R_{12}$, $R_{13}$ and diodes $D_3$, $D_4$. As shown in FIG. 1, resistors $R_{12}$, $R_{13}$ are provided in tank circuit 34 with thyristor $SCR_2$ and resistor $R_{10}$, $R_4$ and diodes $D_3$, $D_4$ connected between tank circuit 34 and capacitor $C_1$.

It is also to be understood that unwanted voltage fluctuations that can degrade the operation of opto-coupler 18 can be bypassed by connecting the base of its transistor 42 to the interconnection between capacitor $C_3$ and Zener diode $Z_3$ (i.e. ground end of $C_3$) by a series combination of a resistor (larger than 0.5 megaohm) and a capacitor (less than 150 picofarad). Some opto-couplers are less sensitive to these voltage fluctuations than others and may not need the bypassing connection described above.

THE SENSING CIRCUIT

The sensing circuit 22 provides a current to opto-coupler 18 that is proportional to the difference between the desired or reference voltage $V_{ref}$ across the load and the actual voltage across the load $V_L$ as measured by a current comparison discussed below. The sensing circuit 22 is principally comprised of resistors $R_{16}$, $R_{17}$, $R_{18}$ and $R_{19}$, transistor or FET 26 and a current amplification device $T_1$ comprised of transistor pair 28. Resistor $R_{16}$ is provided in communication with the load 38 so as to sense the current through load 38 returning to the power supply 10. Potentiometer or Resistor $R_{18}$ is provided in parallel with resistor 16 and thus sees the same voltage as does resistor $R_{16}$. The gate of transistor FET 26 is connected to resistor $R_{18}$ with the source connected to potentiometer or resistor $R_{17}$ which is connected to one end of resistor $R_{18}$. The source of transistor FET 26 is connected to potentiometer or resistor $R_{19}$ and the base of the first transistor 44 in current amplification device $T_1$. The other terminal of resistor $R_{19}$ communicates with the positive terminal to which the load 38 is connected. Device $T_1$ is comprised of two transistors 44, 46, the collectors of which communicate with the diode 40 of opto-coupler 18, and the emitter of the first transistor 44 communicates with the base of the second transistor 46. The emitter of the second transistor 46 communicates with the negative terminal (ground) to which the load 38 is connected.

A simplified representation of the sensing circuit 22 is depicted in FIG. 3. If the $V_{BE}$ of current amplification device $T_1$ can be considered constant, then:

$$i_{in} = (V_L - V_{BE})/R_{19},$$

a linear function of $V_L$

Since $i_{out}$ is constant, the difference $\Delta i$ can be set to be proportional to $(V_L - V_{constant})$ where $V_{constant}$ is some reference point adjustable by the value of $i_{out}$:

$$\Delta i = i_{in} - i_{out}$$

thus:

$$\Delta i = \frac{V_L - V_{BE}}{R_{19}} - \frac{i_{out} R_{19}}{R_{19}} = \frac{1}{R_{19}} (V_L - (V_{BE} + i_{out} R_{19}))$$

where:

$$V_{BE} + i_{out} R_{19} = V_{reference}.$$

After amplification of $\Delta i$, the current through the diode 40 of the opto-coupler 18 is roughly proportional to the deviation of $V_L$ from $V_{reference}$. The signal from diode 40 creates a current through the transistor 42 of the opto-coupler 18 that is roughly proportional to $\Delta i$. This current is fed to the interbase resistance (through base 2) of transistor $UJT_2$, creating an almost proportional $V_{base2}$ of transistor $UJT_2$. This $V_{base2}$, in turn, determines when the next triggering of thyristor $SCR_3$ will occur as explained above.

One way to improve the regulation is to vary the reference current ($i_{out}$) by an amount that is proportional to the load to offset the necessary $\Delta i$ that is needed for regulation. It is convenient to use $\Delta i$ itself as information on the load to change $i_{out}$, but this is unstable feedback. Therefore, an independent source of information on the load must be used to change $i_{out}$ as the load changes.

This is where the resistance $R_{16}$ comes into play. $R_{16}$ essentially senses the current returning from the load 38 to the power supply. The voltage drop across $R_{16}$ is proportional to the load power demand (since $V_L$ is constant). Now, the use of current reference (instead of the traditional voltage reference) by means of a field effect transistor provide a method of adding more current to the reference $i_{out}$ proportionally to the load as shown in FIG. 1. In FIG. 1, resistor $R_{18}$ is a potentiometer that biases the right amount of voltage from $R_{16}$ to the gate of transistor FET 26 to exactly offset the $\Delta i$ used for regulation. The $\Delta i$ is still there, but it is on top of a higher reference $i_{out}$ such that the resulting $V_L$ remains unchanged and thus is not load dependent as this load changes.

The remaining portion of sensing circuit 22 includes diodes $D_7$, $D_8$, $D_9$ and $D_{10}$ along with resistors $R_{20}$ and $R_{21}$. These components protect the power supply, should the user improperly connect lines 50 and 52.

Because physical location of the load 38 and connections thereto varies with use, the sensing lines 50, 52 connecting diode $D_9$ and resistor $R_{19}$ to the load 38 cannot be permanently connected. Therefore user mistakes may occur, such as: (a) the user may forget to connect them to the load, or (b) the connections may be loose, or (c) the connecting lines may be broken, or (d) the connections may be to the wrong polarities. In these cases the power supply and the load must be protected from overvoltage because the power supply may run at maximum power if the sensing circuit is not connected properly.

Protection is thus provided for by $R_{20}$, $R_{21}$, $D_7$, $D_8$, $D_9$ and $D_{10}$ as follows.

If the positive line 52 is not connected to resistor $R_{19}$, then sensing circuit 22 will sense the output voltage at capacitor $C_9$ instead, through resistor $R_{20}$, which is connected to capacitor $C_9$ by line 54. The regulation is then for $V_{C9}$.

If the negative line 50 is not connected to diode $D_9$, then the current through the opto-coupler 18 will return to the ground of capacitor $C_9$ through diodes $D_7$ and $D_8$ and line 56. Regulation is now for $V_L$ with the ground shifted by approximately one forward voltage of a diode. That is, $V_L$ is not held constant at $V_{reference}$ but at approximately $V_{reference} + V_{Fdiode}$.

If the polarities of the lines 50, 52 are reversed, then diode $D_9$ will block or isolate the positive line 52, and diode $D_{10}$ will return the current through the diode 40 of the opto-coupler 18 to the negative line 50. Since this current is now fairly large, the output power will be very small, depressing $V_L$ to a low voltage.

Diode $D_9$ serves an additional purpose. That is, for increasing the drain voltage of transistor FET 26 so that it can operate properly. To maintain diode $D_9$ at a constant voltage drop, resistor $R_{21}$ is used to feed a large current through it.

Further in this sensing circuit 22, potentiometer $R_{17}$ is used for the adjusting of $V_L$ (and thus also $i_{out}$) in the range of from 4 volts to 8 volts.

It is to be understood that power source 10 can be made programmable to provide a programmable voltage output by replacing the constant current sink by a programmable current sink. The power supply can additionally be made to have a constant current output by replacing resistor $R_{19}$ by a constant current source such as a field effect transistor.

It also can be appreciated that low voltage rated SCRs can be used for higher input voltage if the voltage is divided and several charge buildup and transfer circuits, such as circuit 14, are provided in parallel across each portion of the divided input.

INDUSTRIAL APPLICABILITY

The operation of the power supply 10 of the invention is as follows. A fully rectified voltage signal is provided to transformer coil $L_1$. The voltage thereacross is transferred to capacitor $C_4$ of tank circuit 34 when thyristor $SCR_3$ is turned on by the trigger circuit 16. When this occurs, the charge is built up across capacitor $C_4$, and that power is transferred through transformer coil $L_2$ to transformer coils $L_3$ and $L_4$ and therefrom to load 38. Sensing circuit 22 senses the output to the load 38 and provides a signal through opto-coupler 18 to the trigger circuit 16 in order to control the timing of the opening of thyristor $SCR_3$.

Other aspects and objects of the invention can be obtained from a review of the claims and the figures appended hereto.

I claim:

1. A power supply for providing a DC output voltage to a load comprising:
voltage input means for providing input voltage;
charge buildup and transfer means for building up and transferring an output to a load;
switch means for selectively interconnecting the voltage input means and the charge buildup and transfer means;
trigger means for triggering the switch means to interconnect the voltage input means and the charge buildup and transfer means;
sensing means for sensing current in response to the DC output voltage across the load;
a compensated current reference means for providing a current reference;
said sensing means having means for comparing the current sensed by the sensing means to the current reference; and
signal means for providing a signal based on the comparison between the current sensed and the current reference to the trigger means so as to modify the triggering of the switch means and the interconnection of voltage input means and the charge buildup and transfer means.

2. The power supply of claim 1 wherein:
said sensing means includes a first resistor provided in communication with the load and a current amplification device communicating with the first resistor, and with ground and with the signal means; and
wherein said compensated current reference means includes a current sink connected to the connection between said first resistor and said current amplification device.

3. The power supply of claim 2 including:
a second resistor connected between the load and the power supply to sense the current returning to the power supply from the load;
a third resistor provided in parallel with the second resistor;
the current sink including a transistor communicating with the first resistor, with the transistor having a gate that is biased by the voltage at said third resistor.

4. A power supply for providing a DC output voltage to a load comprising:
voltage input means for providing input voltage;
charge buildup and transfer means for building up and transferring a charge;
rectifier and filter means for receiving the charge from the charge build-up and transfer means and for providing an output to a load;
switch means for selectively interconnecting the voltage input means and the charge buildup and transfer means;
reference means for providing a reference;
sensing means for sensing the output and for comparing the output to the reference;
signal means for providing a signal based on the comparison between the output and the reference;
trigger means for turning on the switch means to interconnect the voltage input means and the charge buildup and transfer means;
wherein said trigger means includes a threshold means for providing a threshold signal, and means for building up a time-dependent signal to a level relative to the threshold signal such that said trigger means turns on said switch means, wherein at least one of said threshold means and said means for building up a time-dependent signal is provided with the signal from the signal means; and
means for synchronizing the starting of the means for building up a time-dependent signal so that the starting occurs at a preselected point on the cycle of voltage oscillation in the charge buildup and transfer means.

5. A power supply of claim 4 wherein:
said synchronizing means starts the means for building up a time-dependent signal at the preselected point when the voltage across the charge buildup and transfer means is substantially equivalent to the voltage of the voltage input means.

6. The power supply of claim 4 wherein:
said means for synchronizing the starting of the means for building up a time-dependent signal includes a diode provided in parallel therewith which interconnects the voltage input means and the charge buildup and transfer means such that when said diode conducts, said time-dependent signal starts building up.

7. The power supply of claim 4 wherein:
said voltage input means includes a first transformer coil and first means for applying a voltage to said first transformer coil;
said charge buildup and transfer means includes a second transformer coil and second means for applying a voltage across said second transformer coil; and said switch means includes means for selectively interconnecting said first transformer coil to said second means for applying a voltage across said second transformer coil.

8. The power of claim 7 wherein:
said switch means includes an SCR.

9. The power supply of claim 7 wherein:
said first transformer coil and said second transformer coil are provided on the same transformer core.

10. The power supply of claim 4 wherein:
said voltage input means includes a first transformer coil and first means for applying a voltage to said first transformer coil;
said charge buildup and transfer means includes a second transformer coil and second means for applying a voltage across said second transformer coil;
said switch means includes an SCR that selectively interconnects said first transformer coil to said second means for applying a voltage across said second transformer coil, said SCR being turned off when the voltage buildup on the second means for applying a voltage across said second transformer is larger than the voltage across the first means for applying voltage.

11. The power supply of claim 4 including:
means for slowing the charging of the means for building up a time-dependent signal at startup so that the voltage of the threshold means can build up to the threshold voltage level to turn on the switch means.

12. The power supply of claim 11 wherein:
said means for slowing the charging of the means for building up a time-dependent signal includes an SCR provided in parallel with a first resistor, both interconnecting said voltage input means to said means for building up a time-dependent signal, said SCR including a gate connected to a terminal of said first resistor which terminal is also connected to said means for building up a time-dependent signal;
said first resistor slowing the charging of the means for building up a time-dependent signal at start-up of the power supply until the voltage at the gate builds up to a point that the SCR is turned on, bypassing the first resistor.

13. The power supply of claim 4 wherein:
said sensing means includes a first resistor provided in communication with the load;
said reference means includes a current sink connected to said first resistor; and
said sensing means further includes a current amplification device communicating with the connection between the current sink and the first resistor, and with ground and with the signal means.

14. The power supply of claim 13 wherein said current amplification device includes at least one transistor with the base thereof communicating with the interconnection between the first resistor and the constant current sink, the emitter connected to a ground and the collector connected to said signal means.

15. The power supply of claim 13 including:
a second resistor connected between the load and the power supply to sense the current returning to the power supply from the load;
a third resistor provided in parallel with the second resistor; and
the current sink including a transistor communicating with the first resistor, with the transistor having a gate that is biased by the voltage at said third resistor.

16. The power supply of claim 4 including:
means for discharging the means for building up a time dependent signal when the voltage across said charge buildup and transfer means is close to the voltage at the voltage input means so that the switch means remains turned off.

17. The power supply of claim 16 wherein said means for discharging the means for building up a time dependent signal includes:
a first resistor and a second resistor;
a first unijunction transistor with an emitter thereof connected to the threshold means and one terminal of the means for building up a time dependent signal;
said first resistor connected between the voltage input means and a base of the first unijunction transistor and said second resistor connected between another base of the first unijunction transistor and another terminal of the means for building up a time dependent signal.

18. A power supply for providing a DC output voltage to a load comprising:
voltage input means for providing input voltage;
charge buildup and transfer means for building up and transferring an output to a load;
switch means for selectively interconnecting the voltage input means and the charge buildup and transfer means;
trigger means for triggering the switch means to interconnect the voltage input means and the charge buildup and transfer means;
reference means for providing a reference;
sensing means for sensing the output and having means for comparing the output to the reference;
signal means for providing a signal based on the comparison between the output and the reference to the trigger means so as to modify the triggering of the switch means and the interconnection of voltage input means and the charge buildup and transfer means;
wherein said trigger means includes a unijunction transistor gating circuit having a voltage buildup circuit means for building up a voltage responsive to a voltage across said switch means such that when said trigger means triggers said switch means to conduct, the voltage of the voltage buildup circuit collapses.

* * * * *

UNITED STATES PATENT AND TRADEMARK OFFICE
CERTIFICATE OF CORRECTION

PATENT NO. : 4,646,220

DATED : February 24, 1987

INVENTOR(S) : Kim Dao

It is certified that error appears in the above-identified patent and that said Letters Patent is hereby corrected as shown below:

Column 2, line 29, "two C" should not be in bold type.

Column 7, line 36, "source" should be --drain--.

Signed and Sealed this

Twenty-fifth Day of August, 1987

Attest:

DONALD J. QUIGG

*Attesting Officer*   *Commissioner of Patents and Trademarks*